United States Patent [19]
Burns et al.

[11] Patent Number: 6,013,187
[45] Date of Patent: Jan. 11, 2000

[54] METHOD FOR REMOVING METAL CONTAMINANTS FROM SOLUTION USING MERCAPTO-FUNCTIONAL SILICA XEROGELS

[75] Inventors: Gary Thomas Burns, Ohain, Belgium; Qin Deng, Midland, Mich.; James Richard Hahn, Midland, Mich.; Guy Leo Reggio, Midland, Mich.; Kai Su, Midland, Mich.

[73] Assignee: Dow Corning Corporation, Midland, Mich.

[21] Appl. No.: 09/144,211

[22] Filed: Aug. 31, 1998

[51] Int. Cl.$^7$ .................................................. B01D 15/00
[52] U.S. Cl. ............................................ 210/688; 210/912
[58] Field of Search ................................... 210/679, 688, 210/912

[56] References Cited

U.S. PATENT DOCUMENTS

| | | | |
|---|---|---|---|
| 3,122,520 | 2/1964 | Lentz | 260/46.5 |
| 4,448,694 | 5/1984 | Plueddemann | 210/688 |
| 5,708,069 | 1/1998 | Burns et al. | 524/403 |
| 5,750,610 | 5/1998 | Burns et al. | 524/434 |

OTHER PUBLICATIONS

Separation Science and Technology, vol. 32, No. 15, pp. 2535–2545, 1997.
Science, vol. 276, pp. 923–925, May 9, 1997.
Analyst, vol. 112, pp. 159–162, Feb. 1987.
Analyst, vol. 112, pp. 1409–1412, Oct. 1987.

*Primary Examiner*—Ivars Cintins
*Attorney, Agent, or Firm*—William F. Boley

[57] ABSTRACT

A method for removing metal contaminates from solution using mercapto-functional silica xerogels. The mercapto-functional silica xerogels are characterized by having a surface area greater than 365 m$^2$/g, an average pore diameter of at least 6 nm, and a pore volume of at least 2 cm$^3$/g. The mercapto-functional silica xerogels are particularly useful for removing Group VIII metals such as platinum from solutions comprising polyorganosiloxane fluids and resins.

14 Claims, No Drawings

METHOD FOR REMOVING METAL CONTAMINANTS FROM SOLUTION USING MERCAPTO-FUNCTIONAL SILICA XEROGELS

BACKGROUND OF INVENTION

The present invention is a method for removing metal contaminates from solution using mercapto-functional silica xerogels. The mercapto-functional silica xerogels are characterized by having a surface area greater than 365 $m^2/g$, an average pore diameter of at least 6 nm, and a pore volume of at least 2 $cm^3/g$. The mercapto-functional silica xerogels are particularly useful for removing Group VIII metals such as platinum from solutions comprising polyorganosiloxane fluids and resins.

Lentz, U.S. Pat. No. 3,122,520, teaches a method for making hydrophobic silica xerogels useful as fillers in silicone rubbers. The method comprises heating a silica hydrosol under strong acid conditions to form a hydrophilic silica hydrogel. The hydrophilic silica hydrogel is then contacted with a silane or siloxane treating agent to make a hydrophobic silica hydrogel. The hydrophobic silica hydrogel is reported to have a surface area in the dry state of from 100 to 650 $m^2/g$ as determined by the BET method.

Burns et al., U.S. Pat. No. 5,750,610, extends the teachings of Lentz to a method useful for making mercapto-functional silica xerogels under acidic conditions.

Burns et al., U.S. Pat. No. 5,708,069, teach a method for making mercapto-functional silica xerogels under neutral conditions. The method taught by Burn et al. is particularly useful for making mercapto-functional silica xerogels useful in the present method. Burns et al. do not teach the present method for removing metal contaminants.

Feng et al., Science, Vol. 276, p. 923–925, May 9, 1997, describe treating the surface of a mesoporous silica material with tris(methoxy)mercaptopropylsilane. Feng et al. teach the treated silica is useful to remove heavy metals such as mercury, lead, and silver from aqueous and organic solutions.

Howard et al., Analyst, Vol. 112, p. 159–162, October 1987, teach a silica gel surface modified with (3-mercaptopropyl)trimethoxysilane useful in selectively removing arsenite from aqueous solution. Howard et al. provide no physical description of the silica gel.

Volkan et al., Anaylst, Vol. 112, p. 1409–1412, October 1987, teach the surface modification of a silica gel with (3-mercaptopropyl)trimethoxysilane. Volkan et al. describe the silica gel as "Kieselgel 60, 230–400 mesh," with no further description as to manufacturer or physical characteristics. Volkan et al. teach the modified silica gel can be used to remove cadmium, copper, lead, and zinc from aqueous solution.

Filho et al., Separation Science and Technology, Vol. 32, No. 15, p. 2535–2545, 1997, teach a silica gel surface modified with 2-mercaptoimidazole having a surface area of 365 $m^2/g$ and an average pore diameter of 6 nm. Filho et al. teach this surface modified silica is especially useful for removing mercury from aqueous solutions.

SUMMARY OF INVENTION

The present invention is a method for removing metal contaminates from solution using mercapto-functional silica xerogels. The mercapto-functional silica xerogels are characterized by having a surface area greater than 365 $m^2/g$, an average pore diameter of at least 6 nm, and a pore volume of at least 2 $cm^3/g$. The mercapto-functional silica xerogels are particularly useful for removing Group VIII metals such as platinum from solutions comprising polyorganosiloxane fluids and resins.

DESCRIPTION OF INVENTION

The present invention is a method for removing metal contaminates from solution. The method comprises contacting a solution comprising a metal contaminate with a mercapto-functional silica xerogel having a surface area greater than about 365 $m^2/g$, an average pore diameter of at least 6 nm, and a pore volume of at least 2 $cm^3/g$.

The present invention is a method for removing metal contaminates from solution, where the liquid phase of the solution can be aqueous or organic. When the liquid phase is organic it may be a polar or non-polar organic liquid including aromatic hydrocarbons such as toluene and xylene, alcohols such as methanol and isopropanol, and ethers such diethylether and methylethylether. The liquid phase can be, for example, an organosilane or a polyorganosiloxane. The present method is particularly useful for removing metal contaminates from polyorganosiloxane compositions such as polyorganosiloxane fluids and resins and for the removal of metal contaminates from aqueous and organic waste streams resulting from the production of organosilanes and polyorganosiloxanes.

The contacting of the present method can be conducted as a batch, semi-batch, or continuous process. The method may be conducted, for example, in a standard batch type reactor, in a continuous stirred-tank reactor, or in a fixed-bed reactor, all of standard design known in the art for effecting contact of solids and liquids.

The length of time required for contact of the solution comprising the metal contaminate with the mercapto-functional silica xerogel can generally be from a few minutes to several days, depending upon the contact conditions, characteristics of the mercapto-functional silica xerogel, the metals or metals to be removed, and the desired level of reduction of the metal content of the solution.

The pH of the solution comprising the metal contaminate is not critical to the present method, however it is preferable that the pH be greater than about 3.5 and more preferably at least pH 4. The optimal pH will depend upon such factors as the mercapto-functional silica xerogel and the metal to be removed.

The solution comprising the metal contaminate can comprise one or more metals. As used herein the term metal is intended to comprise both metals and metalloids. The metal contaminate may be selected, for example, from the group consisting of Mg, Ca, V, Cr, Fe, Co, Ni, Rh, Pt, Cu, Ag, and Sn. The present method is especially useful for removing metal contaminates from solution, where the metal contaminate is a Group VIII or Group Ib metal of the Periodic Table of Elements. In a preferred method the metal contaminate is a Group VIII metal. The present method is particularly useful for removing platinum metal from polyorganosiloxane fluids and resins and from waste streams resulting from the production of organosilanes and polyorganosiloxanes.

The concentration of metal contaminates in the solution is not critical and can range from about 100,000 parts per million (ppm) total metals to less than 1 ppm per individual metal. Generally, it is preferred that the concentration of metal contaminates in the solution be about 10 to 1000 ppm per each metal present and the total concentration of metals not exceed 100,000 ppm.

The mercapto-functional silica xerogels useful in the present method are those which during their preparation sustained some collapse of the porous structure during the preparation process. The mercapto-functional silica xerogel useful in the present method has a surface area greater than about 365 m²/g, where the surface area is determined in the dry state by the BET method as described by Brunauer, Emmett, and Teller, Jour. Am. Chem. Soc., 60, 309, 1938. Preferred is when the mercapto-functional silica xerogel has a surface area within in range greater than about 365 m²/g to 1000 m²/g. Most preferred is when the mercapto-functional silica xerogel has a surface area within a range of about 400 m²/g to 850 m²/g. The mercapto-functional silica xerogel of the present invention must have an average pore diameter of at least 6 nm (nanometers) and preferable within a range of at least 6 nm to 20 nm, as measured in the dry state. The mercapto-functional silica xerogel must have a pore volume of at least 2 cm³/g and preferably a pore volume within a range of at least 2 cm³/g to about 3 cm³/g.

The method for making the mercapto-functional silica xerogels useful in the present method is that generally described by Burns et al., U.S. Pat. No. 5,750,610 and Burns et al. U.S. Pat. No. 5,708,069, which are hereby incorporated by reference for their teachings of such methods. A preferred method of making the mercapto-functional silica xerogels is that taught in Burns et al., U.S. Pat. No. 5,708,069, where the mercapto-functional silica xerogel is made under neutral conditions.

The mercapto-functional silica xerogel can be made, for example, by (A) adjusting the pH of a silica hydrosol comprising about 0.02 to 0.5 g of $SiO_2$ per milliliter with a base to within a range of about pH 3 to pH 7 at a temperature within a range of about 10° C. to 250° C. to facilitate formation of a silica hydrogel and (B) mixing the silica hydrogel with (1) a catalytic amount of a strong acid and (2) mercapto-functional silane described by formula $R^1{}_aH_bSiX_{4-a-b}$, where each $R^1$ is an independently selected mercapto-functional organic group, each X is independently selected from the group consisting of halogen and alkoxy radicals comprising 1 to about 12 carbon atoms, a=1, 2, or 3; b=0 or 1, and a+b=1, 2, or 3; to form a mercapto-functional silica hydrogel; and (C) contacting the mercapto-functional silica hydrogel with a sufficient quantity of a water-immiscible organic solvent to convert the mercapto-functional silica hydrogel to a mercapto-functional silica organogel and (D) removing the water-immiscible organic solvent from the mercapto-functional silica organogel to form a mercapto-functional silica xerogel.

In step (A) of the method for making the mercapto-functional silica xerogel, the time required for the silica hydrosol to convert to the corresponding silica hydrogel varies with the temperature and pH. Generally the higher the temperature and the higher the pH the shorter the time needed. Step (A) must be continued until the silica hydrogel acquires a structure such that after being converted to the mercapto-functional silica xerogel, the xerogel has the required physical properties of a surface area greater than 365 m²/g, an average pore diameter of at least 6 nm, and a pore volume of at least 2 cm³/g in the dry state. To determine the proper contact conditions during conduct of step (A) of the method for making the mercapto-functional silica xerogel, it is necessary to proceed with steps (B) through (D) and then measure the physical properties of the resulting product in the dry state. If the surface area, average pore diameter, or pore volume is smaller than the required lower limits, then the conditions for making the silica hydrogel in step (A) of the method for making the mercapto-functional silica xerogel were too severe. An example of suitable conditions for making a mercapto-functional silica xerogel useful in the present method is provided in the Examples herein.

The mercapto-functional silane added as component (B) (2) in the method for making the mercapto-functional silica xerogel can be, for example, selected from the group consisting of mercaptomethylmethyldiethoxysilane, 3-mercaptopropylmethyldimethoxysilane, 3-mercaptopropyltriethoxysilane, and 3-mercaptopropyltrimethoxysilane. Preferred is when the mercapto-functional silane does not comprise nitrogen atoms in the molecule.

The following examples are provided to illustrate the present invention. The examples are not intended to limit the scope of the claims herein.

EXAMPLE 1

Preparation of mercapto-fuictional silica xerogel. A silica hydrosol was prepared by adding 400 ml of PQ N Clear Sodium Silicate (PQ Corporation, Valley Forge, Pa.) diluted with 960 ml of deionized water, 144 ml of concentrated HCl, and 496 ml of deionized water to a 5 L flask. The silica hydrosol was adjusted to pH 4 by use of a dilute solution of PQ N Clear Sodium Silicate (PQ Corporation) in deionized water. A silica hydrogel was formed after stirring. The silica hydrogel was aged at pH 4 by heating to 100° C. and then immediately cooling to room temperature. A mercapto-functional silica xerogel was prepared by adding to the silica hydrogel 733 ml of isopropanol, 200 ml of concentrated HCl, and 140 ml of mercaptopropylmethyldimethoxysilane. The resulting mixture was stirred for 30 minutes and then heated to 50° C. for 40 minutes. About 1.1 L of toluene was added to effect separation of the treated silica hydrogel from the aqueous phase. The aqueous phase was drained off and the toluene phase was heated to reflux to remove residual water. An additional 50 ml of deionized water was added and the resulting mixture was again heated to reflux to remove the water. Then, 1 liter of toluene was added and the resulting mixture filtered to recover the treated silica hydrogel. The filter cake was washed with 1 liter of toluene, slurried in toluene, and washed with another 1 liter of toluene. The resulting filter cake was place in a glass pan and dried over night in a chemical hood at room temperature, followed by 18 h of drying at 120° C. Total yield of mercapto-functional silica xerogel was 240.6 grams.

The mercapto-functional silica xerogel was determined to have a BET surface area of 731 m²/g. The mercapto-functional silica xerogel was determined to have a porosity of 2 cm³/g and an average pore diameter of 7.5 nm as determined by nitrogen adsorption isotherm technique with BJH analysis.

EXAMPLE 2

The effectiveness of the mercapto-functional silica xerogel prepared in Example 1 to remove metals from an aqueous solution was evaluated. An aqueous solution comprising 20 volume percent HCl and the metals described in Table 1 with each metal being present at about 100 ppm (parts per million) was prepared. Ten milliliters of the aqueous solution was added to each of 2 tubes containing 0.12 g of the mercapto-functional silica xerogel as prepared in Example 1. The resulting suspension was mixed on an inversion mixer for 1 day, and then allowed to set at room temperature for 1 week. The suspension was then centrifuged to separate the mercapto-functional silica xerogel from the aqueous phase and the aqueous phase analyzed by Inductive Coupled Plasma (ICP) analysis for metals. For reference purposes, the aqueous solution comprising the metals was analyzed by ICP in triplicate prior to treatment with the mercapto-functional silica xerogel. The percent reduction (% Red.) in metals concentration by treatment with the mercapto-functional silica xerogel is reported in Table 1. In the cases of an increase in metal concentration, the inventors believe this to be a result of contaminates in the xerogel.

TABLE 1

Ability of Mercapto-Functional Silica Xerogel to Reduce Metal Content of an Aqueous Solution of Metals

| Metal | % Red. | Metal | % Red. | Metal | % Red. | Metal | % Red. |
|-------|--------|-------|--------|-------|--------|-------|--------|
| Ag    | 30     | Cr    | 30     | Mn    | *      | Ti    | *      |
| Al    | 31     | Cu    | 29     | Ni    | 35     | V     | 34     |
| B     | *      | Fe    | 25     | P     | *      | Zn    | 28     |
| Ca    | 31     | K     | *      | Si    | *      | Na    | *      |
| Co    | 30     | Mg    | 40     | Sn    | 19     |       |        |

*indicates increase in metal over that found in untreated solution.

EXAMPLE 3

The ability of the mercapto-functional silica xerogel prepared in Example 1 to remove metals from an aqueous solution at pH 4 was evaluated. Duplicate ten milliliter samples of an aqueous solution comprising Ag, Cd, Co, Cr, Cu, Fe, Mn, Ni, V, and Zn at a concentration each of 50 ppm was contacted with 0.12 g samples of the mercapto-functional silica xerogel. The pH of the aqueous solution was adjusted to pH 4 by addition of 5 volume percent $HNO_3$. The contact was effected by placing the samples on an inversion mixer for 1 day. The samples where then centrifuged to separate the mercapto-functional silica xerogel from the aqueous phase and the aqueous phase analyzed by ICP for metals content. The Ag concentration was reduced from 50 ppm to a concentration less than 0.5 ppm and the Cu concentration was reduced from 50 ppm to an average concentration of 9 ppm. The concentrations of the other metals present in the aqueous solution were not reduced.

EXAMPLE 4

The ability of the mercapto-functional silica xerogel prepared in Example 1 to remove platinum from an aqueous solution was evaluated. Duplicate 10 milliliter samples of an aqueous solution comprising 100 ppm Pt was contacted with 0.12 g samples of the mercapto-functional silica xerogel. The pH of the aqueous solution was adjusted to about pH 4 by the addition of 5 volume percent $HNO_3$. The contact was effected by placing the samples on an inversion mixer for 1 day and then storing the samples for 1 week at room temperature. The samples where then centrifuged to separate the mercapto-functional silica xerogel from the aqueous phase and the aqueous phase analyzed by ICP for Pt content. The Pt concentration in the aqueous phase was below the 1 ppm detection limit of the ICP analysis method.

EXAMPLE 5

The ability of the mercapto-functional silica xerogel prepared in Example 1 to remove platinum from a siloxane resin was evaluated. About 34 g of a siloxane resin containing a complex of platinum with divinyltetramethydisiloxane (Pt concentration 207 ppm) was added to 40 ml of toluene and then added to 1 g of the mercapto-functional silica xerogel. The resulting suspension was stirred at room temperature for 24 hours and then filtered to separate the mercapto-functional silica xerogel from the organic phase comprising the siloxane resin and toluene. The toluene was evaporated from the siloxane resin and the liquid siloxane resin analysis by ICP for Pt. The Pt concentration of the siloxane resin was reduced below the 1 ppm detection limit of the ICP method.

We claim:

1. A method for removing metal contaminates from solution comprising contacting a solution comprising a metal contaminate and a liquid phase comprising an organosilane or polyorganosiloxane with a mercapto-functional silica xerogel having a surface area greater than about 365 $m^2/g$, an average pore diameter of at least 6 nm, and a pore volume of at least 2 $cm^3/g$.

2. A method according to claim 1 where the metal is selected from the group consisting of Group VIII and Group Ib metals of the Periodic Table of Elements.

3. A method according to claim 1, where the metal is selected from the group consisting of Pt, Ag, and Cu.

4. A method according to claim 1, where the metal contaminate is platinum metal.

5. A method according to claim 1, where the solution has a pH of at least pH 4.

6. A method according to claim 1, where the mercapto-functional silica xerogel has an average pore diameter within a range of at least 6 nm to 20 nm.

7. A method according to claim 1, where the mercapto-functional silica xerogel has a pore volume within a range of at least 2 $cm^3/g$ to about 3 $cm^3/g$.

8. A method according to claim 1, where the mercapto-functional silica xerogel comprises mercapto-functional silyl groups selected from the group consisting of mercaptomethylmethylethoxysilyl, 3-mercaptopropylmethylmethoxysilyl, 3-mercaptopropyldiethoxysilyl, and 3-mercaptopropyldimethoxysilyl.

9. A method for removing platinum metal from solution comprising contacting a solution having a pH of at least pH 4 and comprising an organosilane and platinum metal with a mercapto-functional silica xerogel having a surface area greater than about 365 $m^2/g$, an average pore diameter within a range of at least 6 nm to about 20 nm, and a pore volume within a range of at least 2 $cm^3/g$ to about 3 $cm^3/g$.

10. A method according to claim 9, where the mercapto-functional silica xerogel comprises mercaptopropylmethylmethoxysilyl groups.

11. A method for removing platinum metal from solution comprising contacting a solution having a pH of at least pH 4 and comprising a polyorganosiloxane and platinum metal with a mercapto-functional silica xerogel having a surface area greater than about 365 $m^2/g$, an average pore diameter within a range of at least 6 nm to about 20 nm, and a pore volume within a range of at least 2 $cm^3/g$ to about 3 $cm^3/g$.

12. A method according to claim 11, where the mercapto-functional silica xerogel comprises mercaptopropylmethylmethoxysilyl groups.

13. A method for removing metal contaminates from solution comprising contacting a solution comprising a metal contaminate with a mercapto-functional silica xerogel having a surface area greater than about 365 $m^2/g$, an average pore diameter of at least 6 nm, and a pore volume of at least 2 $cm^3/g$, where the mercapto-functional silica xerogel comprises mercapto-functional silyl groups selected from the group consisting of mercaptomethylmethylethoxysilyl, 3-mercaptopropylmethylmethoxysilyl 3-mercaptopropyldiethoxysilyl, and 3-mercaptopropyldimethoxysilyl.

14. A method according to claim 13, where the metal contaminate is platinum.

* * * * *